United States Patent [19]

Peters

[11] Patent Number: 4,921,688

[45] Date of Patent: May 1, 1990

[54] PROCESS FOR PREPARING AMMINE SALTS OF ALUMINUM IODIDE

[75] Inventor: Dieter Peters, Hürth, Fed. Rep. of Germany

[73] Assignee: Hoechst Aktiengesellschaft, Frankfurt am Main, Fed. Rep. of Germany

[21] Appl. No.: 240,088

[22] Filed: Sep. 2, 1988

[30] Foreign Application Priority Data

Sep. 18, 1987 [DE] Fed. Rep. of Germany ....... 3731456

[51] Int. Cl.$^5$ .............................. C01C 1/16; C01F 7/48
[52] U.S. Cl. ................................................... 423/463
[58] Field of Search ........................ 423/451, 465, 463

[56] References Cited

U.S. PATENT DOCUMENTS 3,694,150 9/1972 Kidde ................................. 423/465

FOREIGN PATENT DOCUMENTS 186413 11/1965 U.S.S.R. .............................. 423/351

OTHER PUBLICATIONS

Mellor, J. W., "Comphrehensive Treatise on Inorganic and Theoretical Chemistry", New York, 1946, p. 328.
Watt, G. W. et al, J. Amer. Chem. Soc. 78, 5494–5496 (1956).
Chem. Abs. 98:200851p.

*Primary Examiner*—Jeffrey E. Russel
*Assistant Examiner*—Brian M. Bolam

[57] ABSTRACT

A process for preparing ammine salts of aluminum iodide by reaction of aluminum, an iodine compound and ammonia is reported in which the reactants are reacted without mercury as a catalyst in the liquid ammonia phase at a temperature from 20° to 600° C. and a pressure from 8 to 2,000 bar and excess ammonia is evaporated off after the reaction is completed.

The process makes possible the preparation of hexamminealuminum iodide monoammoniate, hexamminealuminum iodide and pentamminealuminum iodide.

12 Claims, No Drawings

PROCESS FOR PREPARING AMMINE SALTS OF ALUMINUM IODIDE

The present invention relates to a process for preparing ammine salts of aluminum iodide, in particular of hexamminealuminum iodide monoammoniate, of hexamminealuminum iodide and pentamminealuminum iodide, by reaction of aluminum, an iodine compound and ammonia.

Investigations on ammine salts of aluminum iodide have been described by G. W. Watt and J. H. Braun in J. Am. Chem. Soc. Volume 78 (1956), pages 5494–5496. It was found that $AlI_3 \times 2ONH_3$ is unstable above $-26°$ C. If $AlI_3 \times 2ONH_3$ is heated at reduced pressure, white crystals of $AlI_3 \times 6NH_3$ are eventually formed at 25° C. and $10^{-3}$ bar. $AlI_3 \times 6NH_3$ can be converted to $AlI_3 \times 5NH_3$ in vacuo.

On page 5495 this article reports that aluminum, iodine and ammonia only react with each other if mercury is added as a catalyst.

It is an object of the present invention to report a process for preparing ammine salts of aluminum iodide from aluminum, an iodine compound and ammonia without a mercury catalyst in high purity and in crystalline form and also as a single crystal.

Surprisingly, it was possible to achieve this object by reacting aluminum, an iodine compound and ammonia in the liquid ammonia phase at a temperature from 20° to 600° C., in particular from 70° to 200° C. and at a pressure from 8 to 2000 bar, in particular 20 to 200 bar and evaporating excess ammonia after the reaction is completed.

Hexamminealuminum iodide monoammoniate is obtained from the reaction product by evaporating excess liquid ammonia at a temperature from 10° to 60° C., in particular 15° to 30° C. at atmospheric pressure.

Hexamminealuminum iodide is obtained from the reaction product by evaporating excess liquid ammonia at a temperature from 65° to 300° C., in particular 80° to 150° C., at atmospheric pressure or aspirating out excess liquid ammonia as a gas at room temperature up to a reduced pressure of $10^{-3}$ bar or aspirating out excess liquid ammonia as a gas at a reduced pressure from 0.3 to 0.7 bar and a final temperature of 30° to 50° C.

Pentamminealuminum iodide is obtained from the reaction product by evaporating excess ammonia at a temperature from 305° to 380° C., in particular 310° to 330° C. at atmospheric pressure.

In a preferred embodiment, chlorine or an inorganic chloride, preferably aluminum chloride or ammonium chloride, is metered into the reactants as a reaction accelerator in an amount of 0.05 to 10% by weight, in particular 0.8 to 1.2% by weight, calculated as I used.

According to the invention, an atomic Al:I ratio of the reactants of 1:(2 to 3.1) is established.

Elemental iodine or ammonium iodide can be used as the iodine compound.

It has been found that in the case of an atomic Al excess with respect to iodine the unconverted aluminum can be separated off from the finished product by screening or the unconverted aluminum and undissolved impurities can be channeled out from the liquid ammonia phase by filtration or decantation.

The ammine salts of aluminum iodide can be incorporated into synthetic resins and synthetic paints as an expandable flameproofing agent.

The following examples serve to illustrate the invention without limiting it to these examples.

EXAMPLE 1

27 parts of aluminum shavings and 435 parts of ammonium iodide are initially introduced into an enameled heatable stirred autoclave under inert gas ($N_2$, Ar). After evacuation, 561 parts of ammonia were condensed into the autoclave. After the autoclave had been closed, it was heated to 75° C. and kept at this temperature for 99 hours. A pressure of 35 bar was reached. The autoclave was then let down to atmospheric pressure at room temperature. The product gave the following analysis:

$$Al_{0.179} I_{0.573} N_{1.289}$$

and therefore corresponded to the formula $$[Al(NH_3)_6] I_3(NH_3) + 0.201\ NH_4I$$

The yield was 94% based on aluminum.

EXAMPLE 2

27 parts of aluminum shavings and 290 parts of ammonium iodide were initially introduced into the autoclave under inert gas ($N_2$, Ar). After evacuation, 408 parts of ammonia were condensed in and the closed autoclave was heated to 400° C. and kept at 400° C. and 150 bar for 65 hours. The autoclave was let down to atmospheric pressure at 25° C. and the product obtained was removed from excess aluminum through a sieve having a clear mesh width of 0.20 mm. The conversion based on iodine was 100%.

The product gave the following analysis:

$$Al_{0.196} I_{0.568} N_{1.326}$$

and therefore corresponded to the following formula $$[Al(NH_3)_6] I_3(NH_3) + 0.037\ Al$$

EXAMPLE 3

Example 2 was repeated except that this time 705 parts of ammonia were condensed in. After a reaction time of 65 hours at 400° C., the autoclave was cooled to room temperature and the reaction mixture was removed from the autoclave using a pressure filter. The ammonia in the filtrate was evaporated at room temperature at atmospheric pressure. There remained 524 parts of crystals which gave the following analysis:

$$Al_{0.187} I_{0.570} N_{1.318}$$

The analytical values therefore corresponded to the formula $$[Al(NH_3)_6] I_3(NH_3) + 0.048\ NH_4I$$

0.44 part of residue remained on the pressure filter, 97% by weight of which was aluminum.

EXAMPLE 4

27 parts of aluminum shavings, 435 parts of ammonium iodide and 4 parts of ammonium chloride were initially introduced into the autoclave under inert gas ($N_2$, Ar). After evacuation, 580 parts of ammonia were condensed in. After the autoclave had been closed, it was heated to 120° C. and kept at a pressure of 90 bar for 8 hours. It was then let down to atmospheric pressure at 120° C. The product gave the following analysis:

$$Al_{0.181} I_{0.591} N_{1.156} Cl_{0.015}$$

and therefore corresponded to the formula $$[Al(NH_3)_{6.04}] I_3 + 0.240\ NH_4I + 0.075\ NH_4Cl$$

The yield based on aluminum was 92%.

EXAMPLE 5

Example 1 was repeated except that after 90 hours the autoclave was kept at room temperature for 12 hours. The pressure of the autoclave was then first released at room temperature and ammonia was finally pumped off in an oil pump vacuum up to $10^{-3}$ bar. The autoclave was kept at room temperature while the ammonia was being pumped off. The product gave the folowing analysis:

$$Al_{0.179} I_{0.597} N_{1.131}$$

and therefore corresponded to the formula $$[Al(NH_3)_{5.98}] I_3 + 0.331\ NH_4I$$

EXAMPLE 6

Example 1 was repeated except that after 90 hours the autoclave was cooled to 40° C. and was let down to atmospheric pressure at this temperature. The contents of the autoclave which was kept at 40° C. were then pumped off up to a pressure of 0.5 bar. The crystalline product gave the following analysis:

$$Al_{0.179} I_{0.594} N_{1.132}$$

and therefore corresponded to the formula $$[Al(NH_3)_6] I_3 + 0.318\ NH_4I$$

EXAMPLE 7

27 parts of aluminum shavings, 381 parts of iodine and 4 parts of ammonium chloride were initially introduced into the autoclave under inert gas (N$_2$, Ar) and after evacuation 540 parts of ammonia were metered in. The autoclave was heated to 320° C. and kept at this temperature and a pressure of 180 bar for 7 hours. The autoclave was then let down to atmospheric pressure a temperature of 320° C. The product gave the following analysis:

$$Al_{0.182} I_{0.612} N_{0.985}$$

and therefore corresponded to the formula $$[Al(NH_3)_{5.05}] I_3 + 0.363\ NH_4I$$

The yield based on aluminum was 89%.

EXAMPLE 8

25 parts of aluminum shavings, 10 parts of aluminum chloride and 435 parts of ammonium iodide were initially introduced into the autoclave under inert gas (N$_2$, Ar). After evacuation, 475 g of ammonia were condensed in. The autoclave was kept at 200° C. under a pressure of 140 bar for 7 hours. The autoclave was then heated to 310° C. and let down to atmospheric pressure. The product gave the following analysis:

$$Al_{0.186} I_{0.595} N_{1.025} Cl_{0.045}$$

and therefore corresponded to the formula $$[Al(NH_3)_{5.07}] I_3 + 0.199\ NH_4I + 0.242\ NH_4Cl.$$

We claim:

1. A process for preparing ammine salts of aluminum iodide by a reaction of aluminum, an iodine compound and ammonia, which comprises reacting the reactants without mercury as a catalyst in the ammonia, wherein the ammonia is in the liquid phase, at a temperature from 20° to 600° C. and a pressure from 8 to 2,000 bar and evaporating excess ammonia after the reaction is completed.

2. The process for preparing ammine salts as claimed in claim 1, wherein the resulting salt is hexamminealuminum iodide monoammoniate, wherein said process comprises evaporating the excess liquid ammonia at a temperature from 10° to 60° C. at atmospheric pressure.

3. The process for preparing ammine salts as claimed in claim 1, wherein the resulting salt is hexamminealuminum iodide, wherein said process comprises evaporating the excess liquid ammonia at a temperature from 65° to 300° C. at atmospheric pressure.

4. The process as claimed in claim 1, wherein excess liquid ammonia is aspirated out as a gas at room temperature and at a reduced pressure of up to $10^{-3}$ bar.

5. The process as claimed in claim 1, wherein excess liquid ammonia is aspirated out as a gas at a reduced pressure from 0.3 to 0.7 bar and a final temperature of 30° to 50° C.

6. The process for preparing an ammine salt as claimed in claim 1, wherein the resulting salt is pentamminealuminum iodide, wherein the process comprises evaporating the excess ammonia at a temperature from 305° to 380° C. at atmospheric pressure.

7. The process as claimed in claim 1, wherein chlorine or an inorganic chloride is metered into the reactants as a reaction accelerator in an amount of 0.05 to 10% by weight, based on iodine used.

8. The process as claimed in claim 1, wherein aluminum chloride or ammonium chloride is metered into the reactants as a reaction accelerator in an amount of 0.05 to 10% by weight, based on iodine used.

9. The process as claimed in claim 1, wherein an atomic Al:I ratio of 1:(2 to 3.1) is established.

10. The process as claimed in claim 1, wherein elemental iodine or ammonium iodide is used as the iodine compound.

11. The process as claimed in claim 1, wherein in the case of an atomic Al excess with respect to iodine the unreacted aluminum is separated off from the finished product by screening.

12. The process as claimed in claim 1, wherein in the case of an atomic Al excess with respect to iodine the unreacted aluminum and undissolved impurities are channeled out from the liquid ammonia phase by filtration or decantation.

* * * * *